Dec. 6, 1955  G. H. HOUCK  2,726,106
WHEEL MOUNTING
Filed Nov. 13, 1950
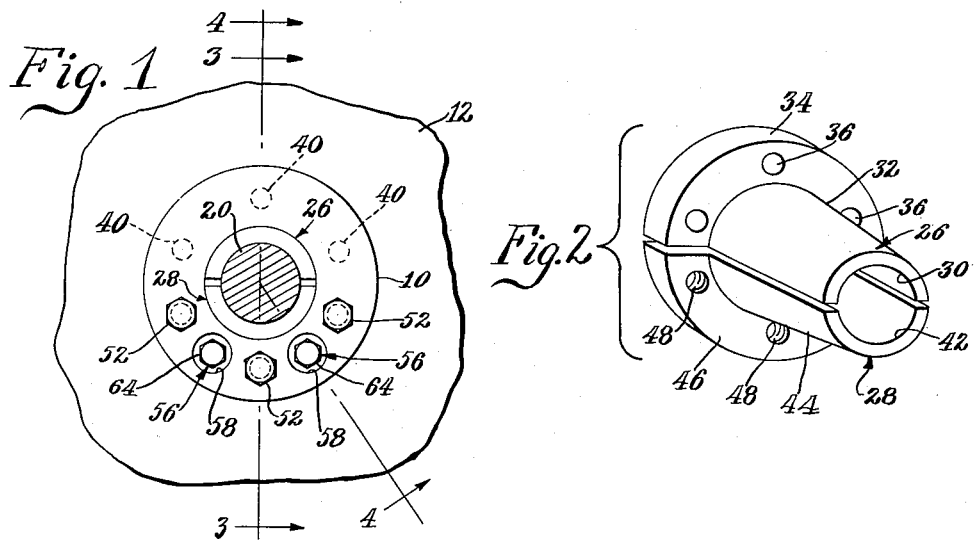
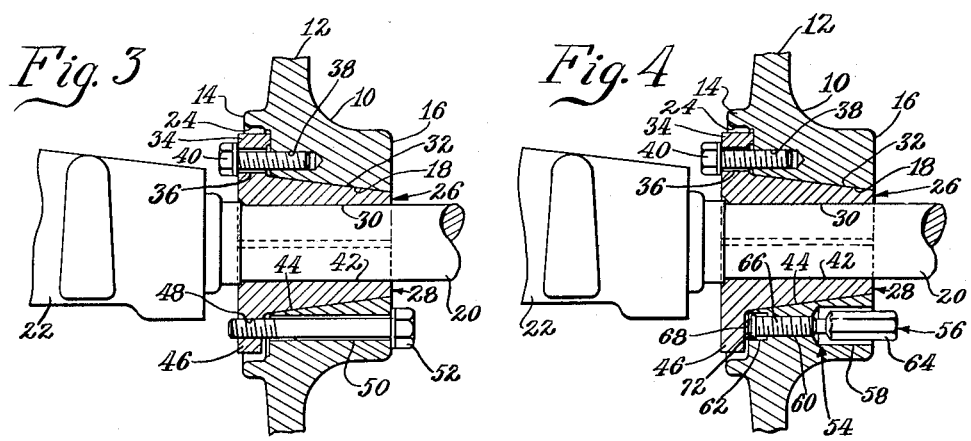
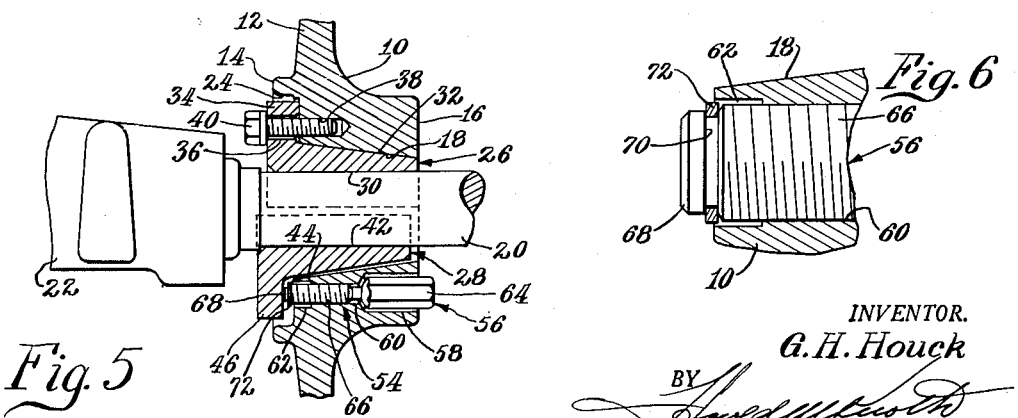
INVENTOR.
G. H. Houck
BY
Attorney

United States Patent Office 2,726,106
Patented Dec. 6, 1955

2,726,106
WHEEL MOUNTING

Gordon H. Houck, Waterloo, Iowa, assignor to Deere Manufacturing Co., Dubuque, Iowa, a corporation of Iowa Application November 13, 1950, Serial No. 195,389

4 Claims. (Cl. 287—52.06)

This invention relates to a wheel and more particularly to a wheel hub assembly for mounting a wheel removably and axially adjustably on an axle.

The invention finds its greatest utility in the mounting of traction wheels on agricultural tractors, in which the adjustability of wheels for the purpose of tread variation is important, thereby accommodating the tractor to different uses, such as plowing and row-crop cultivation. It is known, of course, to secure traction wheels to axles for axial adjustment, and various forms of clamps have been devised and are used for this purpose. One of the prime disadvantages in known clamps is the difficulty with which the clamps are released after extended periods of use, since the tractor is subject to dust and weathering, and rust and dirt accumulate on the axle and sometimes within the hub assembly to such an extent as to cause "freezing" of relatively movable parts.

According to the present invention, a wheel has a central opening for loosely receiving an axle, and a plurality of complementary clamping segments is received between the axle and the opening in the hub and removably secured in place to fix the hub and wheel carried thereby securely to the axle for rotation therewith. It is a feature of the invention to provide means for readily freeing at least one of the clamping segments, this means taking the form of a screw member carried by the hub and engageable with one of the clamping segments to move in a direction opposite to that in which the clamping action is effected. It is a further object of the invention to provide a screw member in the form of a cap screw extending through the hub and having at each of its ends means providing for limited axial movement of the member in either direction, this means being so constructed and arranged as to prevent normally complete removal of the member from the hub, thereby precluding loss of the member during normal operation of the tractor.

A further feature of the invention resides in the provision, in a hub having inner and outer faces, of a tapped bore intermediate these faces and communicating at its opposite ends respectively with the faces by means of enlarged counterbores. The screw member carries at its outer end an integral headed portion received within the outer counterbore and projecting exteriorly of the outer face of the hub to receive a force-applying tool such as a wrench. The inner portion of the screw member has removable means preferably in the form of a spring ring fitting an annular groove in the screw member and closely receivable by the inner counterbore, but, being larger than the tapped bore, operating to prevent loss of the screw member from the hub. The close fit between the spring ring and the inner counterbore provides in effect a dirt seal against the entrance of dirt to the threaded portion of the screw member.

The foregoing and other important objects and desirable features inherent in and encompassed by the invention will become apparent as a preferred embodiment of the invention is disclosed in the following detailed description and accompanying sheet of drawings in which:

Figure 1 is a face view of the hub portion of a wheel.

Figure 2 is a perspective view of the complementary clamping segments.

Figures 3 and 4 are respectively sectional views as seen along the lines 3—3 and 4—4 of Figure 1.

Figure 5 is a sectional view similar to Figure 4 but showing the operation of the screw member in effecting release of one of the clamping segments.

Figure 6 is an enlarged fragmentary sectional view showing the arrangement of the inner end of the screw member and its associated counterbore in the hub.

For the purpose of simplicity and brevity the hub will be referred to as having inner and outer faces. The use of these expressions, as well as the use of other positional and directional terms, is therefore to be considered as illustrative only and not as in any way limiting the spirit and scope of the invention except as defined in the appended claims.

The hub assembly chosen for the purpose of illustration forms a central part or hub 10 of a wheel body 12. The hub 10 has inner and outer faces 14 and 16 and further has an axle-receiving opening 18 therethrough. This opening tapers from a larger inner end toward a smaller outer end and is of such size as to loosely receive and surround an axle 20. This axle is shown as extending outwardly from a housing portion 22 which may form part of the axle housing of a conventional agricultural tractor. The inner face 14 of the hub is provided with a cup-shaped recess 24 coaxial with the tapered opening 18.

The hub 10 is mounted on the axle 20 by means comprising first and second complementary clamping segments 26 and 28. The segment 26 has an inner cylindrical surface 30 for embracing somewhat less than one-half of the cylindrical surface of the axle, and also has an exterior tapered surface 32 which complements substantially less than one-half of the inner surface of the tapered opening 18. The segment 26 is received between the axle 20 and the opening 18 of the hub, as shown, and has a semi-circular radial flange 34 that is received by a portion of the hub recess 24. This flange has a plurality of unthreaded bores 36 therethrough and the hub 10 has a plurality of tapped bores 38 therein respectively in alinement with the bores 36. The respectively alined bores receive securing means in the form of a plurality of cap screws 40. When the cap screws are tightened the segment 26 is moved axially outwardly to its clamping or mounting position.

The other segment 28 is substantially identical to the segment 26 to the end that it has an inner cylindrical surface 42 and an outer tapered surface 44. It also has a semi-circular radial flange 46. When the two segments are assembled they embrace the axle 20 and are in turn received by the opening 18. The flange 46 is radially alined with the flange 34 on the segment 26. This flange 46 has formed therein a plurality of tapped bores 48 and the hub has a plurality of unthreaded bores 50 therethrough. Securing means in the form of a plurality of relatively long cap screws 52 operates to secure the segment 28 to the hub 10, the cap screws passing through the respectively alined bores and, when tightened, drawing the segment 28 axially outwardly and tightly into place to mount the hub assembly on the axle.

The features of construction described above are clearly shown in Figures 1, 2 and 3. Another feature, residing in the means for effecting release of the segment 28, is best shown in Figures 1, 4, 5 and 6. That portion of the hub 10 in which the plurality of bores 50 is formed is further provided with a pair of bores, designated generally by the numeral 54, which respectively receive operating members, designated generally by the numeral 56. Since both members 56 and the bores 54 in which they are received are the same, only one of each will be described.

The bores 54 are positioned so that they open at their inner ends, or at the inner face of the hub 10, to portions of the flange 46 between the tapped bores 48 in that flange. The bore 54 comprises an outer smooth bore 58 which opens at the outer face 16 of the hub 10 and which has a shouldered junction at its inner end with a smaller coaxial tapped bore 60. The tapped bore extends inwardly only part way through the hub and has at its inner end a shouldered junction with a somewhat enlarged inner smooth counterbore 62. This counterbore opens at the inner face of the hub 10 within the cup-shaped recess 24 of the hub.

The operating member 56 has an outer headed end 64 closely receivable within the smooth outer counterbore 58, and further has an integral coaxial threaded shank portion 66 that is screw threaded to be received by the tapped bore 60. The extreme inner end portion of the member 56 is unthreaded, as best shown at 68 in Figure 6. The length of the member is such that the headed portion 64 projects exteriorly of the outer face 16 of the hub to an extent sufficient to receive a force-applying tool such as a wrench (not shown). When it is desired to release the hub assembly from the axle 20, it is necessary merely to back off the cap screws 52 so as to release the application of force thereby to the clamping segment 28. It is not necessary to completely remove these cap screws. After the cap screws 52 are loosened, the members 56 may be rotated in such direction as to propel these members inwardly so that the inner portions 68 thereof push against the flange 46 on the segment 28. This will result in relative axial movement between the segment 28 and other portions of the hub assembly, as suggested in Figure 5. In other words, the application of force by the members 56 is in a direction opposite to that in which clamping action was initially effected by tightening of the cap screws 52.

It is a feature of the invention to provide means whereby the screw members 56 may remain in place during normal use of the tractor. In such use, and when the cap screws 52 are tightened to complete the assembly, the members 56 are backed off as suggested in Figure 4. In order that the members 56 will not be lost from the bores 54, releasable retaining means are provided. As best shown in Figure 6, the inner portion 68 of each member 56 is formed with an annular groove 70 in which is removably received an annular member 72 in the form of a snap or spring ring. The outside diameter of the ring 72 is greater than that of the tapped bore 60 but is slightly smaller than the inside diameter of the inner counterbore 62. The axial spacing of the ring 72 relative to the shouldered junction between the tapped bore 60 and the inner counterbore 62 permits relative axial movement of the member 56. At the same time, as long as the ring 72 is in place, the member 56 cannot be withdrawn. Since the headed end 64 of the member 66 is larger than the tapped bore 60, the member cannot be moved more than a limited amount inwardly, the headed end thus providing means at that end of the member for preventing complete removal of the member from the hub while permitting limited axial movement.

The relationship between the ring 72 and the inner counterbore 62, to the extent that a relatively close fit is provided therebetween, establishes a dirt seal for preventing the entrance of dirt to the tapped bore 60. The relatively close fit between the headed end 64 of the member 56 and the outer counterbore 58 provides substantially the same results at that end of the bore 54. Consequently, the members 56 are not likely to "freeze" and are thus readily available for effecting release of the clamping action afforded by the segments 26 and 28.

What is claimed is:

1. A wheel hub having inner and outer faces and an axial opening therethrough to loosely receive an axle; clamp means embracing the axle and axially receivable by the hub opening at its inner face for securing the hub to the axle; releasable means cooperative between the hub and the clamp means and including an element operative to draw the clamp means axially in the direction toward the outer face of the hub for effecting a clamping action between the hub and axle; said hub having a tapped bore therein on an axis parallel to the axis of the hub, said hub further having a counterbore at the inner end of and larger than the tapped bore and opening at the inner face of the hub; a screw-threaded member threaded into the tapped bore and rotatable to move along its axis in a direction opposite to that in which the clamping action is effected, said member having an inner end portion projecting through the counterbore and engageable with the clamp means to push the clamp means in said opposite direction to relieve the clamping action; said hub also having an enlarged counterbore opening at the outer face of the hub, and said member having a tool-receiving outer end portion extended through said enlarged counterbore and exteriorly of the outer face of the hub; and annular means on the inner end portion of said member larger than the tapped bore, to prevent withdrawal of said member when rotation thereof is reversed, and slightly smaller than the inner counterbore so as to be closely received by said inner counterbore.

2. A wheel hub having inner and outer faces and provided with an axial, axle-receiving opening therethrough, said hub further having a smooth outer bore therein opening at the outer face of the hub and extending inwardly part way through the hub toward the inner face of the hub, a tapped bore smaller than and coaxial with the outer bore and extending from the inner end of the outer bore to a point short of the inner face of the hub, and an inner smooth bore coaxial with and larger than the tapped bore and extending from the inner end of the tapped bore to the inner face of the hub; a screw member extending through the coaxial bores, said member having an intermediate screw-threaded portion received by the tapped bore, an inner portion coaxial with and fixed to the screw-threaded portion projecting through the inner bore to be exposed at the inner face of the hub, and an outer portion coaxial with and fixed to the screw-threaded portion and projecting outwardly through the outer bore to be exposed at the outer face of the hub; a pair of means respectively on said inner and outer portions spaced respectively axially inwardly and outwardly from the junctions of the tapped bore and inner and outer bores and projecting radially outwardly beyond the circumference of the tapped bore so as to provide for limited axial movement of the screw member in both directions; and one of said means being removable from the screw member to provide for removal of the screw member from the tapped bore in one axial direction.

3. The invention defined in claim 2, in which: the removable means is annular and is of such size as to be closely received within its proximate smooth bore; and the other means is shaped to receive a force-applying tool for rotating the member.

4. The invention defined in claim 3, in which: the annular means is a spring ring and the portion of the screw member on which said ring is carried includes an annular groove into which the ring fits and from which the ring may be removed.

References Cited in the file of this patent

UNITED STATES PATENTS

| 491,469 | Carver | Feb. 7, 1893 |
| 1,378,091 | Carlson | May 17, 1921 |
| 1,395,913 | Ford | Nov. 1, 1921 |
| 2,168,126 | Kane | Aug. 1, 1939 |
| 2,377,046 | Siegerist | May 29, 1945 |
| 2,407,032 | Myers | Sept. 3, 1946 |
| 2,482,662 | Dunne | Sept. 20, 1949 |

FOREIGN PATENTS

| 121,613 | Australia | June 20, 1946 |